United States Patent [19]
Bartels et al.

[11] 3,892,010
[45] July 1, 1975

[54] SKINNING MACHINE FOR FISH FILLETS

[75] Inventors: Alfred Friedrich Adolf Bartels, Lubeck-Israeldorf; Gunther Fritz August Heinrich Pinkerneil, Lubeck; Herbert Dietrich August Köhn, Bad Schwartau, all of Germany

[73] Assignee: Nordischer Maschinenbau Rud. Baader, Lubeck, Germany

[22] Filed: Oct. 31, 1973

[21] Appl. No.: 411,234

[30] Foreign Application Priority Data
Nov. 6, 1972 Germany............................ 2254284

[52] U.S. Cl................................................. 17/62
[51] Int. Cl.²......................................... A22C 25/02
[58] Field of Search............................ 17/56, 62, 50

[56] References Cited
UNITED STATES PATENTS
2,173,336  9/1939  Lamere................... 17/62
2,822,569  2/1958  Gradoff et al. .......... 17/56

*Primary Examiner*—Robert Peshock
*Attorney, Agent, or Firm*—Edward F. Levy

[57] ABSTRACT

A machine for skinning fish fillets includes a continuous band cutter at the delivery end of a conveyor belt. Fish fillets are carried skin side downwards on the belt, and are passed into contact with the belt at the cutter position by a multiplicity of narrow pivoted presser plates arranged across the width of the belt. The presser plates are spring-loaded downwards and act on the fish fillets through a flexible apron.

11 Claims, 4 Drawing Figures

SKINNING MACHINE FOR FISH FILLETS

The invention relates to a skinning machine for fish fillets with a flexible conveyor belt which is guided over a reversing roller of small diameter, an endless band knife which is disposed in the zone of the reversing roller and approximately tangentially thereto and is guided over a band knife guide which exposes the cutting edge in the zone of the conveyor belt and with contact pressure means which are lowered over the conveyor belt upstream thereof forming a wedge shaped space.

The purpose of such skinning machines is to skin the fish fillet without cutting into it or leaving skin patches, and leaving the silver skin as the so-called "silver mirror" on the fillet.

In a known fillet splitting and skinning machine (see U.S. Pat. No. 2,654,812) an endless circulating contact pressure belt is disposed above the conveyor belt and is adapted to be lowered on to the said conveyor belt forming a wedge shaped space and is maintained under tension in the zone of the band knife by means of closely disposed and vertically slidable and rotatable annular metal discs which are guided between two support walls in the zone of the band knife. In the aforementioned machine, the metal discs which apply a load on to the contact pressure belt do not enable the downwardly acting pressure to be adapted to the fish fillet and therefore do not permit adaptation to the constantly changing consistency and quality of different kinds of fish fillet. The contact pressure zone of the contact pressure belt is too wide during the passage of the fillet, does not permit clearly defined guiding of the fillet in relation to the cutting edge of the band knife and compresses the fillet, even downstream of the cutting edge of the band knife.

The conveyor belt is supported by two backing rollers upstream of the reversing roller but the backing rollers cannot prevent the conveyor belt, together with the fish fillet, being pressed downwards, particularly upstream of the reversing roller, so that stretching and compressing stresses are applied to the fish fillet. As a result, these such a skinning machine is able to skin fish fillets only by cutting off a slice which contains the skin of the fish. The attempt to skin a fish fillet while leaving the silver mirror leads to unacceptable skin patches remaining on the fish fillet.

An object of the invention is to improve the known fillet splitting and skinning machine so as to avoid the shortcomings of the prior art and more particularly to enable the silver mirror to remain on the fish fillet.

According to the present invention a skinning machine for fish fillets includes a flexible conveyor band passing round a roller of small diameter, an endless band cutter passing approximately tangentially to and in the region of the roller and inclined slightly to the direction of travel of the conveyor band, a guide for the band cutter exposing its cutting edge in the region of the conveyor band, a plane rigid and unyielding supporting plate supporting the upper run of the conveyor band and extending into the angle between it and the roller and pressing means mounted above the conveyor band and sloping down towards it to form a wedge shaped space, such means comprising a set of presser arms mounted close together side by side and independently pivoted and resiliently biased about an axis with their sharply cut off free ends extending close to the cutting edge of the cutter band, and a flexible apron between the presser arms and the conveyor band.

In this way the fillet is conveyed in the stretched position on the conveyor belt to the band cutter and is inndividually and accurately guided upstream of the cutting edge of the said band cutter.

In one form of the invention each side edge of the apron is provided with a row of holes and a tension spring engaging one of the holes holds the apron stretched in the direction of movement of the conveyor band.

Conveniently a resiliently biased plate presses the apron down in the region of its rear end with its forward end covering the cutting edge of the band cutter. This ensures that the fish fillet is guided from above with little friction over the greater part of its length and is simultaneously held down so that the conveyor belt also applies its conveying action over the greater part of its surface.

The presser arms may be provided with an adjustable stop by means of which their minimum height above the upper run of the conveyor belt is adjustable, and have spring levers for adjustable spring elements. This permits simple and reliable adaptation to the quality and consistency of the fillets of fish in different states, of different kind and dimensions.

Conveniently the presser arms are in the form of plates and are provided with spring levers of which those of adjacent arms are offset in relation to one another and are connected to independent springs. In this way the presser arms can be very narrow to provide a practically continuous pressing action.

The resiliently biased plate may be pivoted about the same axis as the presser arms and may be held stressed by a tension spring and/or are provided with sprung fingers. This permits adaptation to the thickness and size of the fish fillets.

In a preferred embodiment of the invention the cutter guide is adjustably pivoted about an axis lying above the plane of the cutter and is adjustable parallel to the plane of the band cutter. Thus the cutter guide may have at each end a slotted member to receive flat surfaces of one of two opposed coaxial bearing pins, adjusting screws to adjust the position of each pin in its slot, and clamping means for securing each pin in its slot, the free end of at least one of the bearing pins carrying an adjusting lever capable of being clamped.

Preferably the cutter guide comprises a support and a blade cover adjustable in relation to the support, receiving the band cutter between them. Thus in one arrangement each end of the cover carries an arm pivoted to the adjacent slotted member, means for adjusting the distance between the cover and the support, and clamping means for clamping the arm to the slotted member.

The band cutter can thus be simply adjusted to position its cutting edge in relation to the edges of the presser plates as well as with regard to its angle of inclination to and its distance from the surface of the conveyor belt.

The band knife can also be adjusted to allow for the reduced width results from regrinding.

The particular advantages achieved by the invention in its preferred form are that the fish fillets can be rapidly and reliably skinned while their silver mirror remains on them, and adaptation to different kinds of fish, fish sizes and fish qualities is possible in such a way as to permit reliable treatment of fillets of herring and mackerel as well as those of cod like fish and flat fish.

The invention may be put into practice in various ways but one specific embodiment will be described by way of example with reference to the accompanying diagrammatic drawings in which.

Figure 1:
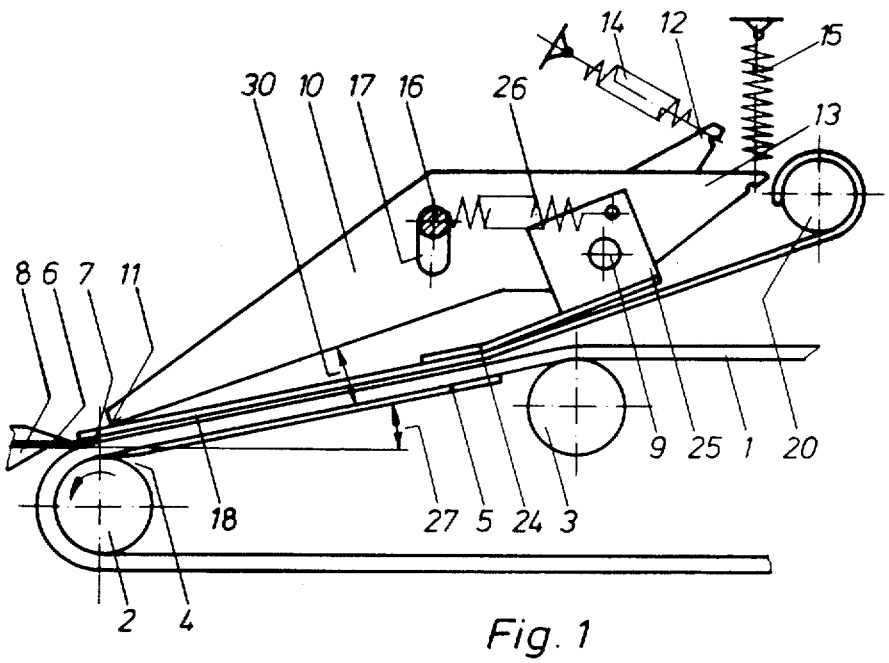
FIG. 1 is a side view in section of part of a fish fillet skinning machine.
Figure 2:
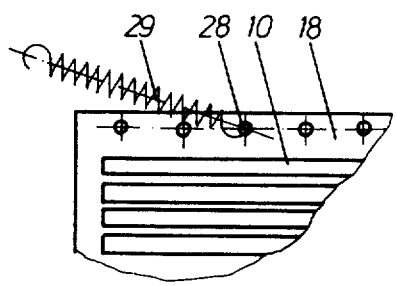
FIG. 2 is a plan view showing a section of one corner of the apron with guide plates.
Figure 3:
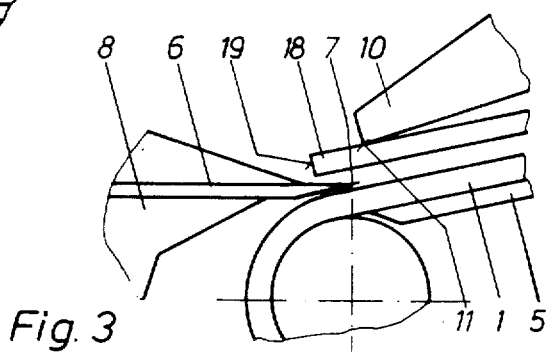
FIG. 3 is an enlarged view of part of FIG. 1 in the zone of the knife cutting edge during the skinning operation and FIG. 4 is an axonometric view of the band knife guide.

The machine includes a conveyor belt 1 passing round a reversing roller 2 rotatable in a machine frame, which is not shown, and driven in a suitable manner in the sense indicated by the arrow. A further reversing roller, not shown, is freely rotatable on an outrigger of the machine frame, which is not shown, and is provided with tensioning means. The conveyor belt 1 passes round the last mentioned reversing roller and the reversing roller 2 and an idler roller 3 which is mounted to rotate in the machine frame. The conveyor belt is a flexible endless belt with one or two fabric inserts and a covering layer of natural or synthetic rubber or of an elastomer which is resistant to foodstuffs. The surface of the said belt is preferably provided with small cylindrical studs which are arranged close together. A support 5 is fixed with respect to the machine frame with its top edge tangential to the reversing roller 2 and the intermediate roller 3, and extending between them. The said support may be of stainless steel sheet of adequate thickness, and extends as far as the pull-in wedge of the reversing roller 2.

A knife guide 8 whose distance from the top edge of the conveyor belt 1 is adjustable, is arranged beyond the end of the support 5 and above the reversing roller 2 to act as guide for an endless band knife 6 which is driven and is reversed over two wheels which are not shown, the guiding action being such that the cutting edge 7 of the band knife is left free.

A shaft 9 which functions as a bearing for a set of presser plates 10 which extend over the width of the conveyor belt 1 is fixed to the machine frame approximately over the intermediate roller 3. The rear ends of the presser plates are alternately provided with arms 12, 13 which are biased by springs 14, 15 adjustably anchored with respect to the machine frame so that their spring force is adjustable. The plates are also provided with apertures 17 in which they are supported by means of a vertically adjustable round rod 16 which functions as a stop. The front ends 11 of the plates 10 are accurately aligned with one another, defining a line transverse of the belt in front of the cutting edge 7 of the band knife 6. The ends 11 are defined by plate edges inclined at right angles and acute angles to the surface of the belt 1.

An apron 18 of highly flexible natural or synthetic rubber or of an elastomer has one end coiled on a tensioning shaft 20 which is disposed in front of the presser plates 10 above the conveyor belt 1. Thus rotation of the shaft 20 enables the apron to be adjusted so that its end edge 19 extends beyond the edges 11 of the guide plates 10 and covers the cutting edge 7 of the band knife 6. Each of the side edges of the apron 18 is provided with a row of eyelets 28, and a tension spring 29 is engaged on each side into one of the said eyelets, the other end of the tension spring being fixed with respect to the machine. Near the end of the support 5 which is remote from the reversing roller 2, the apron is pressed down by the slightly upwardly bent end of a plate 24 to a position close above the upper run of the conveyor belt 1. The plate 24 is mounted on a holder 25 which is pivotable about the shaft 9, one or more tension springs 26 acting on the holder above the shaft 9, the other end of the said springs being fixed with respect to the machine, for example on the stop abutment 16. The plate may be made more resilient by means of slits which are not shown. It is also possible for the plate 24 to be replaced by pivoted plates or arms mounted side by side and individually spring biased.

Figure 4:
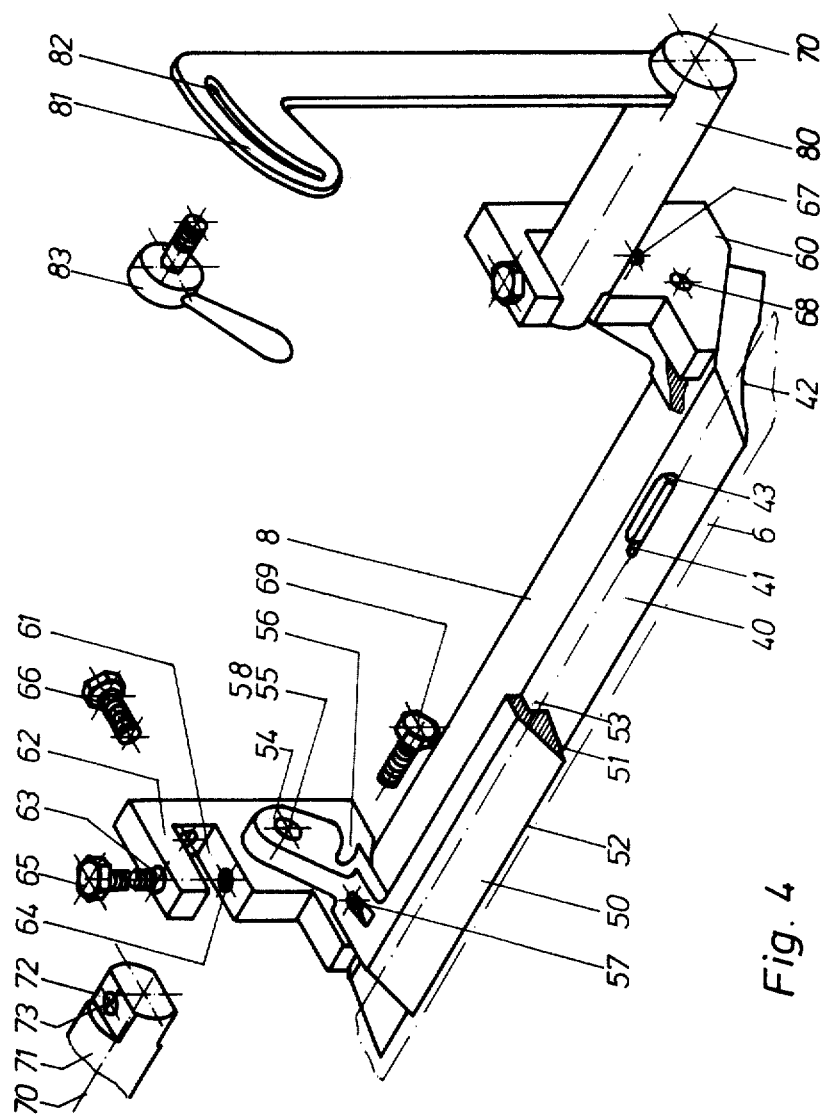

Above and behind the reversing roller 2, as seen in FIG. 4, the frame also affords bearings for coaxial bearing pins 71, 80. Their facing ends are provided with pairs of register surfaces 72 and each is provided with a clearance bore 73 perpendicular to the said surfaces. The free end of the bearing pin 80 is attached to an adjusting arm 81 whose upper end has an arcuate slot 82 through which the screwthreaded shank of an adjusting lever 83 is screwed into a tapped hole in the frame. Slotted members 60 are slid on to the register surfaces 72, each of the said members having the shape of an L the vertical part of which has a slot 61 and a chamfered lower part. The slotted members 60 are fixed on the register surfaces 72 by means of clamping screws 65 which are passed through bores 63 in the clevises 62 above the slots 61, through the bores 73, and are screwed into threaded holes 64 below the slots. The slotted members 60 are rigidly connected by the knife guide 8, and to adjust them relatively to the bearing pins 71 and 80 adjusting screws 66 are screwed into tapped holes in the webs at the back of their slots 61. The knife guide 8 is constructed from a flat piece of stainless steel and comprises a knife support 40 which has a concave part cylindrical under surface 42 to clear the roller 2. Near the ends of the knife guide grooves 41 are milled into the knife support 40 to receive sliding pads 43 of a suitable hard metal. A slender knife cover 50 of triangular cross-section and of a length slightly less than that of the knife support 40, is provided on its underside with a plane guide surface 51, the rear end being provided with a continuous groove 53 while the leading edge 52, which has a chamfer, extends beyond the knife support 40. The cover is provided at both ends with rearwardly extending bearing arms each of which has in it a bore 55 through which a pivot bolt 58 is screwed into a threaded bore 67 formed in the slotted member below the slot. Each arm also has an arcuate slot 56 through which a clamping screw 69 is screwed into a threaded bore 68 in the slotted member. Near each end it is also provided with a socket head adjusting screw 57 which is screwed into a threaded hole in the knife guide.

The skinning machine operates as follows:

A fish fillet, with its skin side facing downwards and with its tail end preferably leading, is placed on the conveyor belt of FIG. 1 and is conveyed thereby to the left. On penetrating below the apron 18 the fillet raises the presser plates 10 individually and these in turn ensure spreading and pressing of the fillet flat on to the conveyor belt 1 via the apron 18. The rigid support 5 prevents the conveyor belt 1 from being downwardly deflected and forces the fish fillet into a flat position. The fish fillet, which is held between the surface of the conveyor belt 1 and the underside of the apron 18, is thus presented in the stretched position to the band knife 6. This shaves off the outer skin with a cut that is guided between the outer skin and the silver mirror which encloses the muscular structure of the fish fillet, leaving the silver mirror on the fish fillet. Presenting the fish fillet in a stretched flat condition to the band knife 6 and guiding of the end of the apron 18 which covers the cutting edge 7, ensures that the said skinning operation is performed without cutting losses and without the formation of skin patches.

The knife guide 8 is adjusted in relation to the presser plates 10 by appropriate rotation of the adjusting screws 66 after releasing the two clamping screws 65. After tightening the clamping screws 65, the cutting thickness required for the appropriate skin thickness of the fish fillets can be adjusted by releasing the adjusting lever 83 and refixing it after pivoting the adjusting arm 81.

To remove the band knife 6 the two clamping screws 69 are released and the knife cover 50 is swung upwardly by pivoting about the two pivot bolts 58. To fit a new band knife 6 it is placed on the knife support 40 so that its trailing edge bears upon the sliding pads 43. After tensioning and checking the running of the band knife the knife cover 50 is swung down and adjusted by means of the two adjusting screws 57 to a height above the knife support 40 which is such that the band knife 6 is movable with the minimum permissible clearance. The knife cover 50 is then again secured by tightening the clamping screws 69.

In a preferred embodiment of the skinning machine the band knife 6 is inclined to the support 5 at an angle 27 which amounts to between 5° and 12°. The angle 30 between the support 5 and the underside of the presser plates 10 also amounts to between 5° and 12°.

What we claim as our invention and desire to secure by Letters Patent is:

1. A skinning machine for fish fillets including
   a flexible conveyor band passing around a roller of small diameter, and having an upper run for receiving fish fillets thereon and transporting said fish fillets toward said roller,
   an endless band cutter located proximate to said roller and extending tangentially to said roller and inclined slightly to the direction of travel of the conveyor band,
   a guide for the band cutter exposing the cutting edge thereof a selected distance above the upper run of the conveyor band,
   a planar rigid and unyielding supporting plate supporting the upper run of the conveyor band and extending into the angle between the roller and said upper run of the conveyor band,
   pressing means mounted above the conveyor band and sloping down towards the latter to form a wedge shaped space, said pressing means comprising
   a set of presser arms mounted close together side by side and independently pivoted and resiliently biased about an axis, said presser arms having sharply cut off free ends extending close to the cutting edge of the cutter band,
   and a flexible apron between the presser arms and the conveyor band, said apron maintaining said fish fillets in flattened condition upon said conveyor band in the vicinity of said band cutter and roller, under downward force of said presser arms.

2. A skinning machine as claimed in claim 1 in which each side edge of the apron is provided with a row of holes and a tension spring engaging one of the holes holds the apron stretched in the direction of movement of the conveyor band.

3. A skinning machine as claimed in claim 1 in which a resiliently biased plate presses the apron down in the region of its rear end with its forward end covering the cutting edge of the band cutter.

4. A skinning machine as claimed in claim 3 in which the resiliently biased plate is pivoted about the same axis as the presser arms and is held stressed by a tension spring and/or is provided with sprung fingers.

5. A skinning machine as claimed in claim 1 in which the presser arms are provided with an adjustable stop by means of which their minimum height above the upper run of the conveyor belt is adjustable, and have spring levers for adjustable spring elements.

6. A skinning machine as claimed in claim 1 in which the presser arms are in the form of plates and are provided with spring levers of which those of adjacent arms are offset in relation to one another and are connected to independent springs.

7. A skinning machine as claimed in claim 1 in which the cutter guide is adjustably pivoted about an axis lying above the plate of the cutter and is adjustable parallel to the plane of the band cutter.

8. A skinning machine as claimed in claim 7 in which the cutter guide has at each end a slotted member to receive flat surfaces of one of two opposed coaxial bearing pins, adjusting screws to adjust the position of each pin in its slot, and clamping means for securing each pin in its slot, the free end of at least one of the bearing pins carrying an adjusting lever capable of being clamped.

9. A skinning machine as claimed in claim 1 in which the cutter guide comprises a support and a blade cover adjustable in relation to the support, receiving the band cutter between them.

10. A skinning machine as claimed in claim 9 in which the support has at each end a slotted member to receive flat surfaces of one of two opposed coaxial bearing pins, adjusting screws to adjust the position of each pin in its slot, and clamping means for securing each pin in its slot, the free end of at least one of the bearing pins carrying an adjusting lever capable of being clamped, and each end of the cutter cover carries an arm pivoted to the adjacent slotted member, means for adjusting the distance between the cover and the support, and clamping means for clamping the arm to the slotted member.

11. A skinning machine as claimed in claim 1 in which the band cutter is inclined to the support at an angle between 5° and 12°, whilst the underside of the presser arms is also inclined to the support for the conveyor belt at an angle between 5° and 12°.

* * * * *